(12) United States Patent
Maziers

(10) Patent No.: US 8,956,708 B2
(45) Date of Patent: Feb. 17, 2015

(54) ROTOLINED ARTICLES

(75) Inventor: Eric Maziers, Seneffe (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 214 days.

(21) Appl. No.: 12/990,649

(22) PCT Filed: May 6, 2009

(86) PCT No.: PCT/EP2009/055454
§ 371 (c)(1),
(2), (4) Date: Feb. 14, 2011

(87) PCT Pub. No.: WO2009/141227
PCT Pub. Date: Nov. 26, 2009

(65) Prior Publication Data
US 2011/0135918 A1   Jun. 9, 2011

(30) Foreign Application Priority Data

May 21, 2008 (EP) .................................... 08156618

(51) Int. Cl.
*B32B 1/02* (2006.01)
*B32B 27/32* (2006.01)
*F16L 9/147* (2006.01)
*B05D 7/22* (2006.01)
*B05D 1/00* (2006.01)
*F16L 58/10* (2006.01)
*B05D 3/02* (2006.01)

(52) U.S. Cl.
CPC ............... *B05D 7/222* (2013.01); *B05D 1/002* (2013.01); *B32B 27/32* (2013.01); *F16L 9/147* (2013.01); *F16L 58/1009* (2013.01); *B05D 3/0254* (2013.01); *B05D 2202/10* (2013.01)

USPC .......................................... 428/36.9; 428/35.8

(58) Field of Classification Search
USPC ....................................... 428/35.8, 35.7, 36.9
See application file for complete search history.

(56) References Cited

U.S. PATENT DOCUMENTS

| | | |
|---|---|---|
| 6,287,632 B1 | 9/2001 | Nishio et al. |
| 6,448,341 B1 | 9/2002 | Kolthammer et al. |
| 2002/0046776 A1* | 4/2002 | Kirjavainen et al. .......... 138/104 |
| 2004/0116608 A1 | 6/2004 | Follestad et al. |
| 2004/0161623 A1 | 8/2004 | Domine et al. |
| 2006/0251835 A1 | 11/2006 | Maziers et al. |
| 2007/0003724 A1 | 1/2007 | Johansson et al. |
| 2009/0004417 A1 | 1/2009 | Follestad et al. |
| 2010/0047596 A1 | 2/2010 | Maziers et al. |

FOREIGN PATENT DOCUMENTS

| | | | |
|---|---|---|---|
| EP | 0479457 A1 | 4/1992 | |
| EP | 1316598 A1 | 6/2003 | |
| EP | 1721739 A1 | 11/2006 | |
| JP | H06-207058 A | 7/1994 | |
| JP | 2008-001802 A | 1/2008 | |
| WO | 98/49245 A1 | 11/1998 | |
| WO | 2004/026554 A1 | 4/2004 | |
| WO | 2004/052975 A1 | 6/2004 | |
| WO | WO 2006/136572 | * 12/2006 | ................. C08J 5/00 |

OTHER PUBLICATIONS

Office Action issued in European Patent Application No. 09749717.6-1303, dated Feb. 4, 2014 (7 pages).
Office Action issued in European Patent Application No. 09749717.6-1303, dated Sep. 19, 2014 (7 pages).

* cited by examiner

*Primary Examiner* — Erik Kashnikow

(57) ABSTRACT

The present invention relates to the field of steel pipes and vessels rotolined with metallocene-produced polyethylene.

12 Claims, No Drawings

ROTOLINED ARTICLES

The present invention relates to the field of steel pipes and vessels rotolined with metallocene-produced polyethylene.

The technique of rotolining allows for a seamless polymer lining to be applied to the interior surfaces of metal structures.

Rotomoulding is used for the manufacture of simple to complex, hollow plastic products. It can be used to mould a variety of materials such as polyethylene, polypropylene, polycarbonate polyamide, or polyvinyl chloride (PVC). Linear low density polyethylene is preferably used as disclosed for example in "Some new results on rotational molding of metallocene polyethylenes" by D. Annechini, E. Takacs and J. Vlachopoulos in ANTEC, vol. 1, 2001.

Polyethylene represents more than 80% of the polymers used in the rotomoulding market. This is due to the outstanding resistance of polyethylene to thermal degradation during processing, to its easy grinding, good flowability, and low temperature impact properties.

A variation of rotomoulding has been used for applying uniform lining to the internal surfaces of metal structures, wherein the metal structure acts as the mould. The polymers that are typically used in rotolining must have excellent adherence to metal. They have been selected from cross-linked polyethylene, or fluoropolymers such as for example polyvinyl difluoride (PVDF), ethylene-chlorotrifluoroethylene (ECTFE) or ethylene-tetrafluoroethylene (ETFE) or ethylene vinyl alcohol (EVOH) or polyamide (PA).

This approach of combining plastic and metal offers the advantages of plastics such as corrosion resistance and cleanability with those of metals such as structural and dimensional stability. Any type of metal can be rotolined provided the selected plastic lining adheres to its surface.

Because of adhesion problems, polyethylene has not been used so far in rotolining. As it is the most commonly used material in rotomoulding, as it has desirable properties and as it is very cheap, it would desirable to use it in rotolining.

It is an aim of the present invention to prepare rotolined articles wherein the lining is prepared from metallocene-prepared polyethylene.

It is another aim of the present invention to prepare rotolined articles wherein the lining is homogeneous.

It is also an aim of the present invention to prepare rotolined articles wherein the polyethylene lining has an excellent adherence to the metal.

Any one of those aims is at least partially solved by the present invention.

Accordingly, the present invention discloses rotolined articles comprising:
a) an outer skin layer prepared from an iron containing alloy;
b) an inner skin layer prepared from a polyethylene-based resin, comprising from 40 to 99.5 wt % of metallocene-prepared homo- or co-polymer of ethylene or a mixture thereof, based on the weight of layer b) composition and from 0.5 to 60 wt % of a functionalised or grafted polyolefin (FPO) or of an ionomer or of a polyolefin (PO) grafted to a non-polyolefin (NPO) in the form of a block copolymer (PO)g-NPO), or of a mixture thereof:
c) optional additional layers prepared from polyamide (PA), ethylene vinyl alcohol (EVOH), polypropylene (PP) or polyethylene (PE), and positioned either between layer a) and layer b) or on the side of layer b) opposite to layer a) or a combination of both.

Preferably, inner skin layer b) comprises homopolymers or copolymers of ethylene and grafted polyethylene or ionomer or combination thereof. In this description, copolymers are prepared from one monomer and one or more comonomers.

In a preferred embodiment according to the present invention, the composition of inner skin layer b) comprises at least 70 wt %, preferably at least 80 wt %, based on the weight of skin layer b) composition and at most 99.5 wt %, preferably, at most 99 wt % and preferably at most 98 wt % of metallocene-prepared polyethylene. It comprises at least 0.5 wt %, preferably 1 wt %, more preferably 2 wt % and at most 30 wt %, preferably at most 20 wt % of functionalised or grafted polyethylene or ionomer or mixture thereof.

The metallocene-prepared polyethylene can advantageously be a mixture of metallocene-produced polyethylene resins having different density and/or melt index in order to tailor the properties of the polyethylene coating.

The functionalised or grafted polyolefins, if present are polyolefins grafted with a material that provides polarity and/or reactivity and they therefore depend upon the nature of the adjacent layers. Preferably in the present invention, the polyolefins are grafted with anhydride and preferably, the polyolefin is polyethylene or polypropylene, more preferably, it is polyethylene. Alternatively, an ionomer is used alone or in combination with the grafted polyolefin, preferably in combination. Functionalised or grafted polyethylene provides excellent adhesion properties whereas ionomers enhance mechanical properties. In a more preferred embodiment according to the present invention, a mixture of ionomer and grafted polyethylene is used in the composition of inner skin layer b).

An ionomer is a polyelectrolyte that comprises copolymers containing both electrically neutral repeating units and a fraction of ionised units, usually representing at most 15 percent of the polymer. They link in such a way that, even though they are stiff at room temperature, the bonds may be broken down thermally and the new linkages will cause the material to act as though it were a thermoplastic material. The ionic attractions that result strongly influence the polymer properties, especially its mechanical properties.

In an ionomer, the nonpolar chains are grouped together and the polar ionic groups are attracted to each other. This allows thermoplastic ionomers to act in ways similar to that of cross-linked polymers or block copolymers, but in fact they are reversible cross-linkers. When heated, the ionic groups lose their attractions for each other and the chains become mobile. The chains motion increases with increasing temperature and the groups can no longer stay in their clusters. This produces a polymer that has the properties of an elastomer and the processability of a thermoplastic.

Suitable ionomers can for example be selected from poly (ethylene-co-methacrylic acid). This polymer is a sodium or zinc salt of copolymers derived from ethylene and methacrylic acid.

The preferred polyethylene according to the present invention is a homo- or co-polymer of ethylene produced with a catalyst comprising a metallocene on a silica/aluminoxane support. More preferably, the metallocene component is ethylene-bis-tetrahydroindenyl zirconium dichloride or dimethylsilylene-bis(2-methyl-4-phenyl-indenyl) zirconium dichloride. The most preferred metallocene component is ethylene-bis-tetrahydroindenyl zirconium dichloride.

The melt index of the polyethylene resin preferably used in the present invention is typically at least equal to 0.5 dg/min, preferably of at least 1 dg/min. It is preferably at most equal to 25 dg/min, preferably of at most 20 dg/min. The melt flow index MI2 is measured following the method of standard test ASTM D 1283 at a temperature of 190° C. and a load of 2.16 kg.

The homo- and co-polymers of ethylene that can be used in the present invention preferably have a density of at least 0.920 g/cc, preferably of at least 0.930 g/cc. It is of at most 0.965 g/cc, preferably of at most 0.960 g/cc. The density is measured following the method of standard test ASTM D 1505 at 23° C.

The polyethylene of the present invention may also have a bi- or multimodal molecular weight distribution, i.e. they may be a blend of two or more polyethylenes with different molecular weight distributions, which can be blended either physically or chemically, i.e. produced sequentially in two or more reactors.

The polydispersity D of the polyethylene suitable for the present invention is in the range 2 to 20, preferably 2 to 15, more preferably less than or equal to 10, and most preferably less than or equal to 6, the latter range being typically associated with the preferred metallocene-prepared polyethylene resins. The polydispersity index D is defined as the ratio Mw/Mn of the weight average molecular weight Mw over the number average molecular weight Mn.

The resins of the present invention may also comprise other additives such as for example antioxidants, acid scavengers, antistatic additives, fillers, slip additives or anti-blocking additives, processing aid.

The metal used as external skin layer in the rotolined article is preferably steel.

In rotolining, the metal article is used as mould. Said mould is filled with the pelletised composition used as internal skin layer, placed in the oven, and rotomoulded.

Additional layers prepared from different materials can be added in order to provide specific properties.

Said additional layers may be advantageously prepared from polypropylene, polyethylene, polyamide, polyvinylidene fluoride or fluoropolymers containing functional groups, ethylene/vinyl alcohol.

Polypropylene that can be used in the present invention typically has a melt flow index MI2 of from 1.5 to 100 g/10 min. The melt flow index MI2 is measured following the method of standard test ASTM D 1238 at a temperature of 230° C. and under a load of 2.16 kg.

The polyamides that can be used in the present invention are the products of condensation:
- of one or more amino acids such as aminocaproic acid, 7-aminoheptanoic acid, 11-aminoundecanoic acid and 12-aminododecanoic acid of one or more lactams such as caprolactam, oenantholactam and lauryllactam;
- of one or more salts or mixtures of diamines such as hexamethylenediamine, dodecamethylenediamine, meta-xylylenediamine, bis(p-aminocyclohexyl)methane and trimethylhexamethylenediamine with diacids such as isophthalic acid, terephthalic acid, adipic acid, azelaic acid, suberic acid, sebacic acid and dodecanedicarboxylic acid.

As examples of polyamides, mention may be made of PA 6 and PA 6-6.

It is also advantageously possible to use copolyamides. Mention may be made of the copolyamides resulting from the condensation of at least two α,ω-aminocarboxylic acids or of two lactams or of one lactam and one α,ω-aminocarboxylic acid. Mention may also be made of the copolyamides resulting from the condensation of at least one α,ω-aminocarboxylic acid (or a lactam), at least one diamine and at least one dicarboxylic acid.

As example of copolyamide, one can cite PA 6/12 and PA 6/6-6.

Mixtures of polyamide and polyolefins can also be used as additional layer(s). The polyamide is as disclosed hereabove. The polyolefin can be a functionalised or a non-functionalised polyolefin or can be a mixture of at least one functionalised and/or of at least one non-functionalised polyolefin.

More generally, amine terminated materials can also be used in the additional layer(s) and they are preferably selected from polyamide diamine (PAdiNH$_2$).

The polyamides can also be impact-modified polyamides or foamed polyamides.

Additional layer(s) may further advantageously be prepared from polyurethane or from a composition comprising polyamide and ethylene/vinyl alcohol copolymers (EVOH), or from ethylene/vinyl alcohol copolymer alone and more generally, from a composition comprising polyamide and a barrier layer.

Such multiple layer linings can be prepared either by manual introduction of material during the moulding cycle, or by the use of a drop-box, or by a one-shot system.

Manual addition involves moving the mould from the oven, removing a vent tube or plug that creates an opening in the part and adding more material using a fennel or wand. This operation must be repeated for each additional layer.

A drop-box typically contains a single material layer and it is an insulated container that holds material until it is released at the appropriate time during the cycle. The signal for release of material is usually transmitted as a pressure pulse via the airline through the arm of the machine. The insulation must be kept cool to prevent the material inside the box from melting.

In either method, there are two critical factors:
- the temperature at which the subsequent layer is added: it is critical for determining the wall thickness of the previous skin formed and how well the two layers may be bound together;
- the time elapsed before addition of the subsequent layer of material: if the mould is at rest for too long, material that has already adhered to the wall may sag.

It is possible to reduce these problems by lowering the melt index of the first layer and/or by reducing the injection temperature of the next layer, and/or by cooling the mould slightly before injection or the next layer.

The cycle time necessary to produce rotolined articles depends upon the mass injected for each layer.

The present invention also discloses a method for preparing rotolined articles that comprises the steps of:
a) providing the metallic hollow article to be lined as a mould;
b) feeding the the composition of the inner skin layer into the mould;
c) placing the filled mould in pre-heated oven;
d) rotating it about two perpendicular axes;
e) optionally repeating the operation with the desired additional layers either before and/or after inner skin layer b);
f) cooling the mould;
g) retrieving the lined metal article.

Typically, the oven temperature is of from 280 to 300° C. The temperature inside the mould is preferably of the order of 160° C.

The mould is typically cooled with cold air.

The present invention is particularly suitable for preparing rotolined steel pipes or vessels.

The invention claimed is:
1. A rotolined article comprising:
   an outer skin layer prepared from an iron containing alloy;
   an inner skin layer prepared from a polyethylene-based resin consisting of a metallocene-produced homopolymer of ethylene, a metallocene-produced copolymer of ethylene, or mixtures thereof, in amounts ranging from 70 to 99.5 wt % based on the total weight of the inner skin layer;

a material selected from the group consisting of a functionalized polyolefin (FPO), an ionomer, a polyolefin (PO) grafted to a non-polyolefin (NPO) in the form of a block copolymer (PO)g-(NPO), and combinations thereof, in amounts ranging from 0.5 to 30 wt % based on the total weight of the inner skin layer; and at least one additional layer prepared from materials selected from the group consisting of polyamide (PA), ethylene vinyl alcohol (EVOH), polypropylene (PP), polyethylene (PE), and combinations thereof, wherein the at least one additional layer:
  comprises a first additional layer that is positioned between the outer skin layer and the inner skin layer, wherein the first additional layer is applied directly to the outer skin layer and the inner skin layer.

2. The rotolined article of claim 1, wherein the iron containing alloy is steel.

3. The rotolined article of claim 1, wherein the metallocene-produced homopolymer of ethylene, the metallocene-produced copolymer of ethylene, or mixtures thereof is prepared with a bistetrahydroindenyl or a bisindenyl catalyst component.

4. The rotolined article of claim 1, wherein the inner skin layer composition comprises the polyethylene-based resin in amounts ranging from 80 to 98 wt %, and from 2 to 20 wt % of the material selected from the group consisting of the functionalized polyolefin (FPO), the ionomer, the polyolefin (PO) grafted to the non-polyolefin (NPO) in the form of the block copolymer (PO)g-(NPO), and combinations thereof.

5. The rotolined article of claim 1, wherein the inner skin layer composition comprises a combination of the functionalized polyolefin (FPO) and the ionomer.

6. The rotolined article of claim 1, wherein the inner skin layer has a thickness ranging from 1 to 3 mm.

7. The rotolined article of claim 1, wherein the inner skin layer is homogenous.

8. The rotolined article of claim 1, wherein the rotolined article is a pipe.

9. The rotolined article of claim 1, wherein the rotolined article is a vessel.

10. The rotolined article of claim 1 wherein the at least one additional layer further comprises a second additional layer positioned on the side of the inner skin layer opposite to the outer skin layer.

11. The rotolined article of claim 1, wherein the material of the inner skin layer is the ionomer.

12. The rotolined article of claim 1, wherein the FPO is functionalized polypropylene.

* * * * *